US012505275B2

(12) United States Patent
Ghattas et al.

(10) Patent No.: US 12,505,275 B2
(45) Date of Patent: Dec. 23, 2025

(54) COMMUNICATION PROTOCOLS DESIGN VERIFICATION THROUGH DATABASE SYSTEMS FOR HARDWARE-BASED EMULATION PLATFORMS

(71) Applicant: Siemens Industry Software Inc., Plano, TX (US)

(72) Inventors: Georges Antoun Elias Ghattas, Cairo (EG); John Samir Ramses Wasef, Cairo (EG); Mohamed Ahmed Mostafa Shaaban, Cairo (EG)

(73) Assignee: Siemens Industry Software Inc., Plano, TX (US)

( * ) Notice: Subject to any disclaimer, the term of this patent is extended or adjusted under 35 U.S.C. 154(b) by 1725 days.

(21) Appl. No.: 16/194,839

(22) Filed: Nov. 19, 2018

(65) Prior Publication Data
US 2019/0155985 A1    May 23, 2019

Related U.S. Application Data

(60) Provisional application No. 62/590,108, filed on Nov. 22, 2017.

(51) Int. Cl.
*G06F 30/398* (2020.01)
*G06F 11/26* (2006.01)
*G06F 11/27* (2006.01)

(52) U.S. Cl.
CPC ......... *G06F 30/398* (2020.01); *G06F 11/261* (2013.01); *G06F 11/27* (2013.01)

(58) Field of Classification Search
CPC ...... G06F 3/0656; G06F 21/41; G06F 11/261; G06F 9/3834; G06F 30/398; G06F 30/23;
(Continued)

(56) References Cited

U.S. PATENT DOCUMENTS 6,977,227 B2 * 12/2005 Lin ..................... H01L 21/3086
                                                                438/386
8,645,568 B2 *  2/2014 Patterson ............... H04L 45/42
                                                                709/240

(Continued)

OTHER PUBLICATIONS

Hasebe, Koji, et al. "Power-saving in large-scale storage systems with data migration." 2010 IEEE Second International Conference on Cloud Computing Technology and Science. IEEE, 2010. (Year: 2010).*

(Continued)

*Primary Examiner* — Michael Edward Cocchi

(57) ABSTRACT

A system may include a hardware-based emulation platform configured to emulate operation of a design-under-test ("DUT"), a database system, and a verification system. The verification system may include a storage system which may include a memory layer and a local storage layer, where the memory layer has a lower memory access latency than the local storage layer. The verification system may also include a design verification engine configured to send test data to the hardware-based emulation platform; buffer response data received from the DUT into the memory layer and the local storage layer; determine to aggregate the response data stored in both the memory layer and local storage layer into a write transaction according to buffering criteria, and issue the write transaction to the database system to store the aggregated response data in the database system.

13 Claims, 6 Drawing Sheets

(58) Field of Classification Search
CPC .......... G06F 30/39; G06F 11/27; G06F 30/33; G06F 30/3308; G06F 30/3315; G06F 30/331; G06F 30/20; G06F 30/25; G06F 30/27; G06F 30/28; H04L 69/02
See application file for complete search history.

(56) References Cited

U.S. PATENT DOCUMENTS

| | | | | |
|---|---|---|---|---|
| 8,682,705 | B2* | 3/2014 | Bobak | H04L 41/0631 705/7.22 |
| 8,930,647 | B1* | 1/2015 | Smith | G06F 12/0811 711/E12.008 |
| 10,050,966 | B2* | 8/2018 | Hayton | H04L 63/0815 |
| 10,360,092 | B1* | 7/2019 | Ayoub | G06F 11/0784 |
| 10,846,163 | B1* | 11/2020 | Ayoub | G06F 11/0784 |
| 2009/0171704 | A1* | 7/2009 | Bobak | G06Q 10/103 705/1.1 |
| 2009/0182896 | A1* | 7/2009 | Patterson | H04L 45/54 709/240 |
| 2010/0211415 | A1* | 8/2010 | Tholl | G06Q 40/08 707/E17.005 |
| 2014/0351492 | A1* | 11/2014 | Chen | G06F 3/0647 711/103 |
| 2015/0261676 | A1* | 9/2015 | Busaba | G06F 12/0815 711/144 |
| 2016/0149765 | A1* | 5/2016 | Mittal | H04L 69/02 703/21 |
| 2018/0059980 | A1* | 3/2018 | Takeda | G06F 3/0652 |
| 2018/0275902 | A1* | 9/2018 | Monday | G06F 3/0632 |
| 2019/0205244 | A1* | 7/2019 | Smith | G06F 3/065 |

OTHER PUBLICATIONS

Duffield, Nick G. "On adaptive bandwidth sharing with rate guarantees." Proceedings. IEEE INFOCOM'98, the Conference on Computer Communications. Seventeenth Annual Joint Conference of the IEEE Computer and Communications Societies. Gateway to the 21st Century ((Cat. No. 98. vol. 3. IEEE, 1998. (Year: 1998).*

* cited by examiner

COMMUNICATION PROTOCOLS DESIGN VERIFICATION THROUGH DATABASE SYSTEMS FOR HARDWARE-BASED EMULATION PLATFORMS

CROSS-REFERENCE TO RELATED APPLICATION

This application claims priority to U.S. provisional patent application No. 62/590,108 filed on Nov. 22, 2017 and titled "FUNCTIONAL-PROTOCOLS DESIGN VERIFICATION THROUGH DATABASE-ORIENTED SYSTEMS BASED ON HARDWARE ACCELERATORS EMULATION PLATFORMS", the entirety of which is incorporated herein by reference.

BACKGROUND

Electronic circuits, such as integrated microcircuits, are used in nearly every facet of modern society, from automobiles to microwaves to personal computers. Design of microcircuits may involve many steps, known as a "design flow." The particular steps of a design flow are often dependent upon the type of microcircuit being designed, its complexity, the design team, and the microcircuit fabricator or foundry that will manufacture the microcircuit. Electronic design automation (EDA) applications support the design and verification of circuits prior to fabrication. EDA applications may include various functions, tools, or features to test or verify a design at various stages of the design flow.

SUMMARY

Disclosed implementations include systems, methods, devices, and logic that may support communication protocols design verification through database systems for hardware-based emulation platforms.

In one example, a method may be performed, executed, or otherwise carried out by a computing system. The method may include sending test data to a hardware-based emulation platform configured to emulate operation of a design-under-test ("DUT"), wherein the test data is configured with verification settings to test different communication protocols for the DUT; receiving response data from the hardware-based emulation platform; buffering the response data into different memories of the computing system, including a memory layer and local storage layer, wherein the memory layer has a lower memory access latency than the local storage layer; determining to aggregate the response data stored in both the memory layer and local storage layer into a write transaction according to buffering criteria, the buffering criteria based on a communication speed of the hardware-based emulation platform, a remaining capacity of the memory layer, a remaining capacity of the local storage layer, or a combination thereof; and issuing the write transaction to a database system to store the aggregated response data in the database system.

In another example, a system may include a hardware-based emulation platform configured to emulate operation of a DUT, a database system, and a verification system. The verification system may include a storage system comprising different memories, including a memory layer and a local storage layer, wherein the memory layer has a lower memory access latency than the local storage layer. The verification system may also include a design verification engine configured to send test data to the hardware-based emulation platform, wherein the test data is configured with verification settings to test different communication protocols for the DUT; receive response data from the hardware-based emulation platform; buffer the response data into the memory layer and the local storage layer; determine to aggregate the response data stored in both the memory layer and local storage layer into a write transaction according to buffering criteria, the buffering criteria based on a communication speed of the hardware-based emulation platform, a remaining capacity of the memory layer, a remaining capacity of the local storage layer, or a combination thereof; and issue the write transaction to the database system to store the aggregated response data in the database system.

In yet another example, a non-transitory machine-readable medium may store processor-executable instructions. When executed, the instructions may cause a system to send test data to a hardware-based emulation platform configured to emulate operation of a DUT, wherein the test data is configured with verification settings to test different communication protocols for the DUT; receive response data from the hardware-based emulation platform; buffer the response data into different memories of the computing system, including a memory layer and local storage layer, wherein the memory layer has a lower memory access latency than the local storage layer; determine to aggregate the response data stored in both the memory layer and local storage layer into a write transaction according to buffering criteria, the buffering criteria based on a communication speed of the hardware-based emulation platform, a remaining capacity of the memory layer, a remaining capacity of the local storage layer, or a combination thereof; and issue the write transaction to a database system to store the aggregated response data in the database system.

BRIEF DESCRIPTION OF THE DRAWINGS

Certain examples are described in the following detailed description and in reference to the drawings.

DETAILED DESCRIPTION

Figure 1:
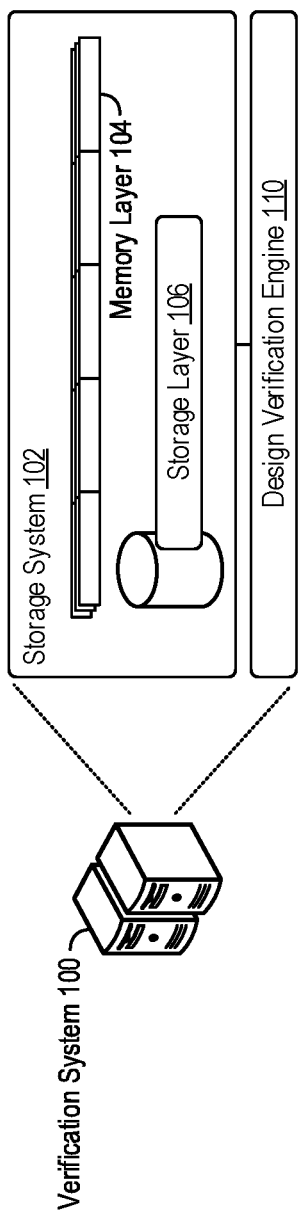
FIG. 1 shows an example of a verification system that supports communication protocols design verification through database systems for hardware-based emulation platforms.

The following disclosure relates to design verification, including for EDA applications and CAD systems which may be used to facilitate the design, verification, and manufacture of integrated circuits. In some design environments, emulators are used to verify a circuit design prior to manufacture. Emulators may be hardware-based or software-based, and hardware-based emulation platforms may be implemented in various forms, including field-programmable gate array (FPGA)-based emulators and processor-based emulators. Such hardware-based emulation platforms may also operate in various modes, including in-circuit emulation modes and acceleration modes (whether transaction based or cycle based).

As circuit designs continue to increase in complexity, emulation of circuit designs (which may be referred herein as designs-under-test or DUTs) may likewise increase in complexity. Hardware-based emulation platforms may provide various acceleration techniques by which immense amounts of test and response data can be streamed to and from such emulation platforms. As emulators increase in speed and capability, the sheer amount of data generated during such verifications can be overwhelming. For instance, emulation datastreams exchanged between workstations and emulation platforms may contain, as examples, the emulated circuit design model (e.g., FPGA configuration bitstreams), initial register contents, design memory configurations, debugging logic, test datastreams, DUT response datastreams, and more. For computing systems lacking the technical capability to handle such data transfers, packet data exchanged between testing systems and a hardware-based emulation platform may be dropped, improperly handled, or corrupted. Such information loss may invalidate circuit verifications, e.g., by compromising the integrity of circuit design response data. Moreover, testing of various communication protocols for the DUTs may be compromised, slowed, or ineffective when test systems are incapable of efficiently handling or storing DUT response data.

The features described herein may support communication protocols design verification through database systems for hardware-based emulation platforms. In particular, various communication protocols verification features described herein may utilize database systems as a mechanism to store response data for a DUT. The various features described herein may also provide various technical improvements by which a testing system may transfer DUT response data to database systems with increased efficiency. Moreover, the communication protocols verification features described herein may reduce communication latencies and increase accuracy in a manner such that circuit design verifications for DUTs through hardware-based emulation platforms may be performed more effectively.

As communication interfaces between a hardware-based emulation platform and testing systems (e.g., workstations) may support various communication protocols, the features described herein may be consistently applied to any number of communication protocols, including as examples Ethernet, TCP/IP, IPv4, IPv6, WiFi, 802.11a-d (or any other 802.11 specifications), inter-express transport, multimedia streams (e.g., HDMI or HDCP), and many more. The communication protocols verification features described herein may also support increased analysis capabilities for DUT response data communicated through such communication protocols. For instance, through use of database systems to store DUT response data, query features may be provided through advanced filtering to obtain performance data for the DUT with respect to different communication protocols.

These and other communication protocols verification features according to the present disclosure are described in greater detail herein.

FIG. 1 shows an example of a verification system 100 that supports communication protocols design verification through database systems for hardware-based emulation platforms. The verification system 100 may include a single or multiple computing devices such as application servers, compute nodes, data servers, desktop or laptop computers, smart phones or other mobile devices, tablet devices, embedded controllers, and more. In some implementations, the verification system 100 is implemented as workstation by which a user may access, configure, and test a DUT implemented by (e.g., loaded onto) a hardware-based emulation platform.

The verification system 100 may include any number of components to support verification of DUTs emulated via an emulation platform. Such components may include a combination of hardware and software, such as a physical storage system 102 by which the verification system 100 may store data associated with DUT verifications. In the example shown in FIG. 2, the storage system 102 includes different layers of data storage accessible to the verification system 100, including a memory layer 104 and a local storage layer 106. The memory layer 104 and local storage layer 106 of a verification system 100 may represent any different physical memories of the verification system 100 such that the memory layer 104 has a lower access latency than the local storage layer 106. In some examples, the memory layer 104 of the storage system 102 includes the processor caches, random access memory (RAM), and other volatile memories implemented in the verification system 100. The local storage layer 106 may include, in some implementations, any non-volatile memory of the verification system 100, such as hard-drives, solid state drives, hard disks, etc. As described in greater detail below, the verification system 100 may leverage both the memory layer 104 and local storage layer 106 as memories to aggregate DUT response data for subsequent storage into a database system.

The verification system 100 may also include various communication interfaces to exchange data with a hardware-based emulation platform (e.g., transaction-level interfaces that support communication speeds of multiple GBs/sec). The verification system 100 may also implement or execute testing software by which a user can specify input DUT test settings, parameter values, testbenches, or other testing configurations used to verify a DUT emulated by a hardware-based emulation platform.

In some implementations, the verification system 100 implements a design verification engine 110 by which the verification system 100 performs any number of DUT verification actions, such as the communication protocols verification features described herein. The verification system 100 may implement the design verification engine 110 (and components thereof) in various ways, for example as hardware and programming. The programming for the design verification engine 110 may take the form of processor-executable instructions stored on a non-transitory machine-readable storage medium and the hardware for the design verification engine 110 may include a processor to execute those instructions. A processor may take the form of single processor or multi-processor systems, and in some examples, the verification system 100 implements multiple engine components or system elements using the same computing system features or hardware components (e.g., a common processor or common storage medium).

In operation, the design verification engine 110 may send test data to a hardware-based emulation platform, the test data configured with verification settings to test different communication protocols for the DUT. The design verification engine 110 may also receive response data from the hardware-based emulation platform, buffer the response data into the memory layer 104 and the local storage layer 106 of the storage system 102, and determine to aggregate the response data stored in both the memory layer 104 and local storage layer 106 into a write transaction according to buffering criteria. The buffering criteria may be based on a communication speed of the hardware-based emulation platform, a remaining capacity of the memory layer 104, a remaining capacity of the local storage layer 106, or a combination thereof. Then, the design verification engine 110 may issue the write transaction to a database system to store the aggregated response data in the database system.

These and other communication protocols verification features are described in greater detail next.

Figure 2:
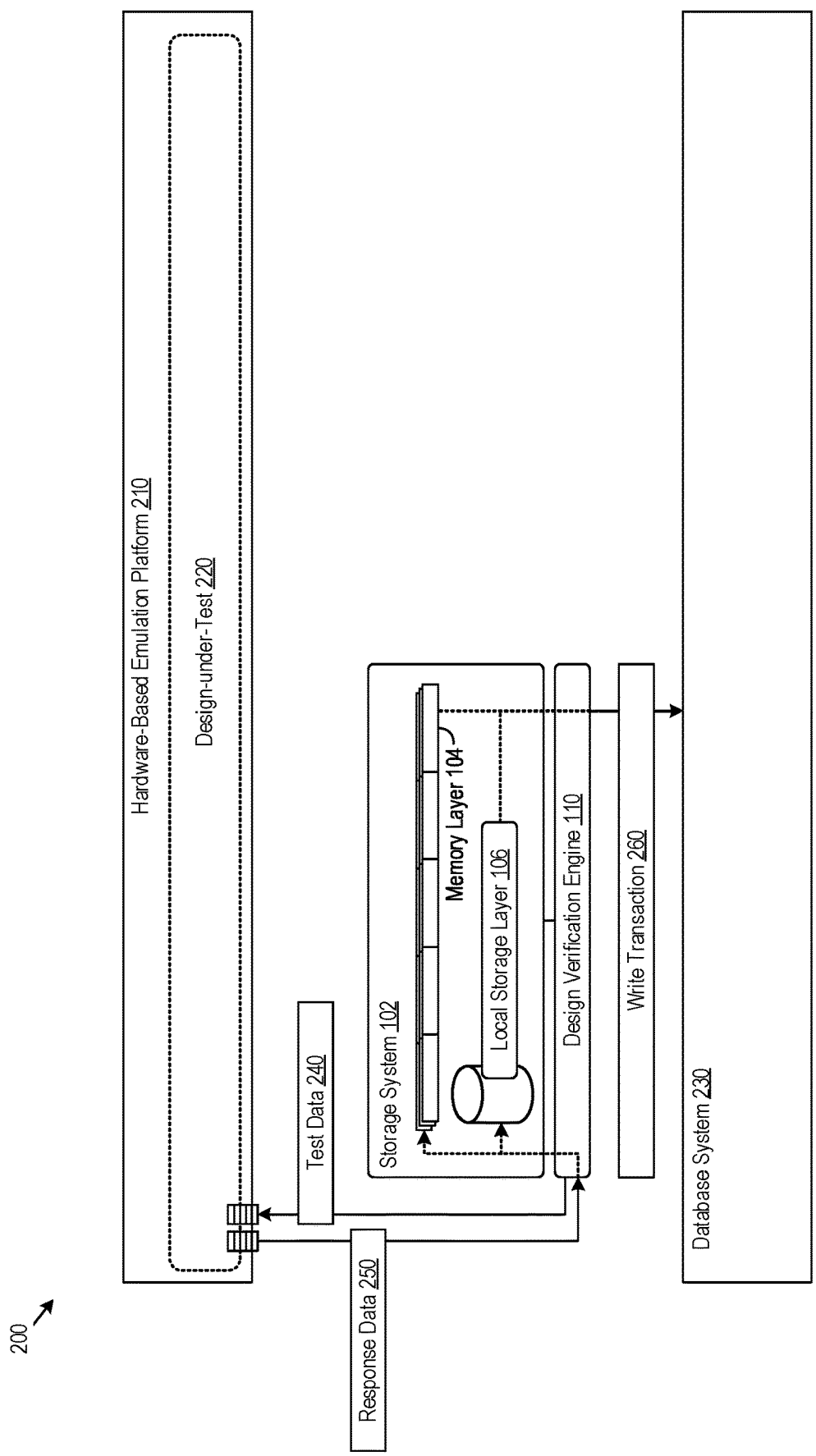
FIG. 2 shows an example of a computing system that supports communication protocols design verification through database systems for hardware-based emulation platforms.

FIG. 2 shows an example of a computing system 200 that supports communication protocols design verification through database systems for hardware-based emulation platforms. The computing system 200 shown in FIG. 2 includes a storage system 102 and design verification engine 110, which may be together implemented as part of a workstation or other computing device. The computing system 200 shown in FIG. 2 also includes a hardware-based emulation platform 210.

As noted above, a hardware-based emulation platform 210 may support emulation of various circuit designs, which may be referred to as DUTs. In that regard, the hardware-based emulation platform 210 may include any combination of FPGAs, Boolean processors, cross-bar communication channels, communication interfaces (including ingress and egress communication ports, and whether physical or logical), transactors (to manage DUT transactions), or any other hardware or logic to support DUT emulation and verification. In FIG. 2, the hardware-based emulation platform 210 is configured to emulate the DUT 220. The design verification engine 110 may obtain and communicate DUT data (e.g., a FPGA configuration bitstreams) to the hardware-based emulation platform 210 to implement the DUT 220 with any of the configurable hardware components of the hardware-based emulation platform 210.

As also shown in the example of FIG. 2, the computing system 200 includes a database system 230. The database system 230 may be any computing resource that implements data structures for storing DUT response data. In some implementations, the database system 230 includes dedicated data servers to store DUT response data from multiple different workstations (e.g., verification systems 100). In particular, the database system 230 may implement non-relational data structures, e.g., unstructured databases that need not require a particular data input format or do not enforce a specific data schema for stored data. The database system 230 may be physically separate from the hardware-based emulation platform 210 as well as any testing workstations that implement design verification engines 110 used to test the DUT 220.

In operation, the design verification engine 110 may obtain and send test data 240 to the hardware-based emulation platform 210 to test the DUT 220. The test data 240 may include design configuration data (e.g., FPGA bit streams or initial circuit design memory values) or verification data (e.g., test benches or other test datastreams to verify operation of the DUT). In that regard, the design verification engine 110 may configure the test data 240 with verification settings to test the DUT with regards to different communication protocols. Such verification settings may include specific TCP/IP ports for exchange of test data 240, IPv4 or IPv6 addresses, MAC addresses, UDP settings, or any other communication protocol parameter in which the design verification engine 110 may configure communications with the hardware-based emulation platform 210 and DUT 220.

The design verification engine 110 may receive response data 250 from the hardware-based emulation platform 210. The response data 250 may include any data transmitted from the DUT 220 through the hardware-based emulation platform 210. Responsive to the test data 240, the DUT 220 may return various response data units of different sizes, formats, and according to different communication protocols set by the verification settings configured into the test data 240. As the response data 250 provided by the hardware-based emulation platform 210 may be communicated at high-speeds (e.g., 3+ GB/sec), the design verification engine 110 may implement various mechanisms to increase the efficiency and effectiveness by which the response data 250 is stored and analyzed.

In some implementations, the design verification engine 110 selectively stores the response data 250 provided by the DUT 220 according to memory access latencies. For instance, the design verification engine 110 may buffer incoming response data 250 in either the memory layer 104 or local storage layer 106 of the storage system 102, but do so by prioritizing storing the response data 250 in the memory layer 104. As the memory layer 104 has a lower access latency than the local storage layer 106, the design verification engine 110 may leverage the lower write latency into the memory layer 104 to buffer the incoming response data 250 communicated by the DUT 220.

The design verification engine 110 may select the memory layer 104 to store received response data 250 until the memory layer 104 reaches a stored capacity threshold (e.g., 95% storage capacity). By doing so, the design verification engine 110 may prevent data loss or packet loss such that the memory layer 104 does not overflow its storage capacity (and potentially drop or lose provided response data 250). Additionally or alternatively, the design verification engine 110 may enforce a no-drop policy for incoming data packets containing the response data 250. If the rate at which the hardware-based emulation platform 210 sends response data 250 exceeds the maximum memory access rate of the memory layer 104 (e.g., full write capacity into the memory layer 104), the design verification engine 110 may store a remaining portion of the response data 250 into the local storage layer 106 (though doing so at a slower speed as the memory access latency of the local storage layer 106 may be higher than that of the memory layer 104).

The rate at which an emulation platform provides DUT response data may vary according to any number of characteristics of the emulation platform (e.g., physical vs software-based), circuit design properties, user-specified parameters (e.g., CLK speeds), or other DUT characteristics. Example factors include compiled clock rate of an emulation design, number of communication ports emulated/supported by the emulation platform for a given DUT, number of co-models connected to a DUT, etc. While some example data communication rates are used for illustrative purposes, other communication characteristics based on a variety of factors for the hardware-based emulation platform may be determined, specified, or used to prioritize use of the memory layer 104 for buffering response data 250 of the DUT 220.

To illustrate, the hardware-based emulation platform 210 may provide response data 250 to the design verification engine 110 specific to a particular circuit design at a given speed or rate (e.g., 2.5 GB/s as an aggregated rate totaled for multiple emulated communication ports or data speeds that vary on a per port-basis). In this illustration, the memory layer 104 may support write speeds of up to a threshold rate (e.g., 2.0 GB/s). The design verification engine 110 may prioritize storage of the response data 250 into the memory layer 104 by storing a portion of the response data 250 at a maximum or threshold access speed for the memory layer 104 (writing 2.0 GB/sec into the memory layer 104) and storing the remaining portion of the response data 250 into the local storage layer 106 (writing the remaining incoming DUT response data 250 that is not stored into the memory layer 104 into the local storage layer 106 instead).

In some implementations, the design verification engine 110 may flush the contents of the memory layer 104 into the local storage layer 106. As the design verification engine 110 may prioritize storage of response data 250 into the memory layer 104 and that the memory layers 104 of a system commonly have a lower storage capacity than local storage layers 106, the memory layers 104 of a verification system 100 may reach a threshold storage capacity in storing response data 250 more quickly or frequently than local storage layers 106. The design verification engine 110 may periodically flush the contents of the memory layer 104 to the local storage layer 106 (e.g., every 25 seconds or at any rate configurable via a system setting or user input). As another option, the design verification engine 110 may automatically initiate a flush operation for the memory layer 104 when a threshold storage capacity is reached (e.g., when the memory layer 104 is 90% full). As yet another option, the design verification engine 110 may implement a combination of periodic and threshold-based data flushing of the memory layer 104.

As described above, the design verification engine 110 may buffer response data 250 received from the DUT 220. Long-term storage of response data 250 in the memory layer 104 and local storage layer 106 may not be feasible, depending on the amount of generated response data 250 and the duration of DUT testing (as some test streams may last multiple days or weeks, generating immense amounts of response data 250 for the DUT 220). Instead of local storage in verification system 100, the design verification engine 110 may support subsequent storage of buffered response data 250 in the database system 230, and the design verification engine 110 may implement various mechanisms to increase the efficiency by which the stored response data 250 is transferred to the database system 230. In effect, the computing system 200 may utilize multi-layers local and remote storage to buffer and store DUT response data.

In some examples, the design verification engine 110 aggregates the buffered response data 250 stored in both the memory layer 104 and local storage layer 106 into a write transaction 260 to issue to the database system 230. The determination to aggregate the buffered response data 250 may be done according to buffering criteria, and the buffering criteria may be based on a communication speed of the hardware-based emulation platform 210, a remaining capacity of the memory layer 104, a remaining capacity of the local storage layer 106, or a combination thereof. The buffering criteria applied by the design verification engine 110 may be implemented to reduce (e.g., minimize or otherwise optimize) the number of write transactions issued to the database system 230 to store buffered response data 250. The lesser the number of write transactions, the less memory access overhead the design verification engine 110 may incur to transfer the buffered response data 250 for long-term storage via the database system 230.

As such, one example of buffering criteria may specify that the design verification engine 110 aggregate (e.g., batch) any buffered response data 250 stored in the memory layer 104 and/or local storage layer 106 when the combined storage capacity of the memory layer 104 and local storage layer 106 exceeds a predetermined storage capacity threshold (e.g., >97% filled). The storage capacity threshold may be configured to reduce or eliminate packet loss, e.g., by initiating response data aggregation and write transaction issuance with sufficient time such that the memory layer 104 and local storage layer 106 will not overflow (reach or exceed 100% storage capacity).

As another example, the buffering criteria may be based on a speed or rate at which the hardware-based emulation platform 210 communicates response data 250. As noted above, the rate at which an emulation platform communicates DUT response data may differ according to any number of characteristics of the emulation platform, circuit design properties, or other DUT characteristics.

As an illustrative example, a data communication rate of the hardware-based emulation platform for a given DUT (e.g., 3 GB/sec total among emulated communication ports) may provide an indication of a certain amount of response data 250 that will be transmitted over a period of time. The buffering criteria may control the design verification engine 110 to aggregate response data 250 into one or more write transactions after a determined amount of response data 250 has been buffered (e.g., 20 GB totaled among emulated communication ports, 25 MB, a maximum write size supported by the database system 230, or at any other data size-specific criterion). As yet another example, the buffering criteria may specify aggregation of response data 250 when the local storage layer 106, in particular, has reached a threshold storage capacity. Such criteria may account for the feature to flush response data 250 from the memory layer 104 at various points, and thus use the storage capacity of the local storage layer 106 as a determinative criterion for when to initiate batching of response data 250 into write transactions.

In the example shown in FIG. 2, the design verification engine 110 aggregates response data 250 stored in the memory layer 104 and/or local storage layer 106 into the write transaction 260. Through buffering criteria, the design verification engine 110 may optimize (e.g., increase or maximize) the amount of response data 250 aggregated into the write transaction 260. For instance, the design verification engine 110 may batch the response data 250 that accounts for 95%+ of the storage capacity of the memory layer 104 and local storage layer 106 into a single write transaction. In doing so, the design verification engine 110 may reduce write latency to transfer response data 250 to the database system 230 by reducing the total number of write transactions required to transfer the response data 250. The lesser the number or overall write transactions, the lesser number of memory accesses and data transfer operations that may be required for storage of the response data 250 in the database system 230, which may thus improve the efficiency of data transfer and increase the technical capability and operational speed of verification systems.

During the time in which the design verification engine 110 constructs and issues the write transaction 260, additional response data 250 may be received by the design verification engine 110 (e.g., as provided by the DUT 220 or as analyzed/processed by the design verification engine 110 itself). As the design verification engine 110 flushes the contents of the local storage layer 106 and/or memory layer 104, the design verification engine 110 may continue to intake additional response data 250 that will not yet be transferred to the database system 230 via the write transaction 260. To preserve this additional response data 250 as the memory layer 104 and local storage layer 106 are flushed, the design verification engine 110 may allocate a backup buffer specifically to store any additional response data 250 received during construction (e.g., during data preparation and memory flushing) of the write transaction 260.

In some implementations, such a backup buffer is part of the storage system 102, but separate from the memory layer 104 or local storage layer 106. In other implementations, the design verification engine 110 allocates a specific portion of the memory layer 104 or local storage layer 106 to serve as the backup buffer. As a backup buffer may be used to store response data 250 during construction of write transactions, but the design verification engine 110 may otherwise keep the backup buffer empty. During or after issuance of the write transaction 260, the design verification engine 110 may flush the contents of the backup buffer (temporarily storing response data 250 during write transaction construction) to the memory layer 104 or local storage layer 106. By allocation of a separate backup buffer for use during write transaction construction, the design verification engine 110 may implement a capability to continue to receive response data 250 even as previously received response data 250 is aggregated into the write transaction 260. By continuing to receive response data 250 during write transaction construction, the design verification engine 110 may reduce or eliminate verification stalls that occur when response data 250 cannot be received or processed, which may improve the overall efficiency and performance of verification systems.

As another example of mechanisms to reduce write latencies, the design verification engine 110 may disable exception reporting on write transactions for the database system 230 such that any associated errors for the write transaction 260 issued to the database system 230 are not reported to the design verification engine 110. For instance, the design verification engine 110 may configure the database system 230 to disable exception reporting or other error reporting, which may reduce write transaction latencies by reducing the amount of communications exchanged between the design verification engine 110 (issuing write transactions) and the database system 230 (performing the write transactions into data structures). That is, the design verification engine 110 may prioritize the data throughout for transferring response data 250 for storage at the database system 230 by reducing or eliminating transfer of reporting data.

Another mechanism by which data throughput of the response data 250 may be prioritized is via use of unstructured databases to store the response data 250. The database system 230 may implement unstructured data structures (e.g., non-relational databases) that do not require data input according to a particular input schema or conform to a particular input format. Or, the database system 230 may implement semi-structured databases with reduced schema or data formatting requirements, which may reduce the amount of data processing or preparation needed by the design verification engine 110 to generate the write transaction 260. Use of unstructured or semi-structured databases for storage of response data 250 is discussed in greater detail with regards to FIG. 3 below.

As another communication protocols verification feature contemplated by the present disclosure, the response data 250 buffered and aggregated into write transactions may include analyzed DUT response data. In some implementations, the design verification engine 110 itself may inspect, monitor, annotate, or otherwise analyze response data 250 received from the DUT 220. Any analysis data (e.g., packet counts, port data, inter-flow analysis, latency or throughput calculations) generated by the design verification engine 110 may also be recognized by the design verification engine 110 as response data 250 aggregated into the write transaction 260 for storage in the database system 230. As contemplated and used herein, response data 250 may include any monitored, inspected, or annotated DUT response data as well as any analysis data generated by the design verification engine 110 for DUT response data. By storing such forms of response data 250 in the database system 230, the design verification engine 110 may support additional query capabilities to extract performance data for the DUT 220, and such analysis and query features are discussed in greater detail below.

Figure 3:
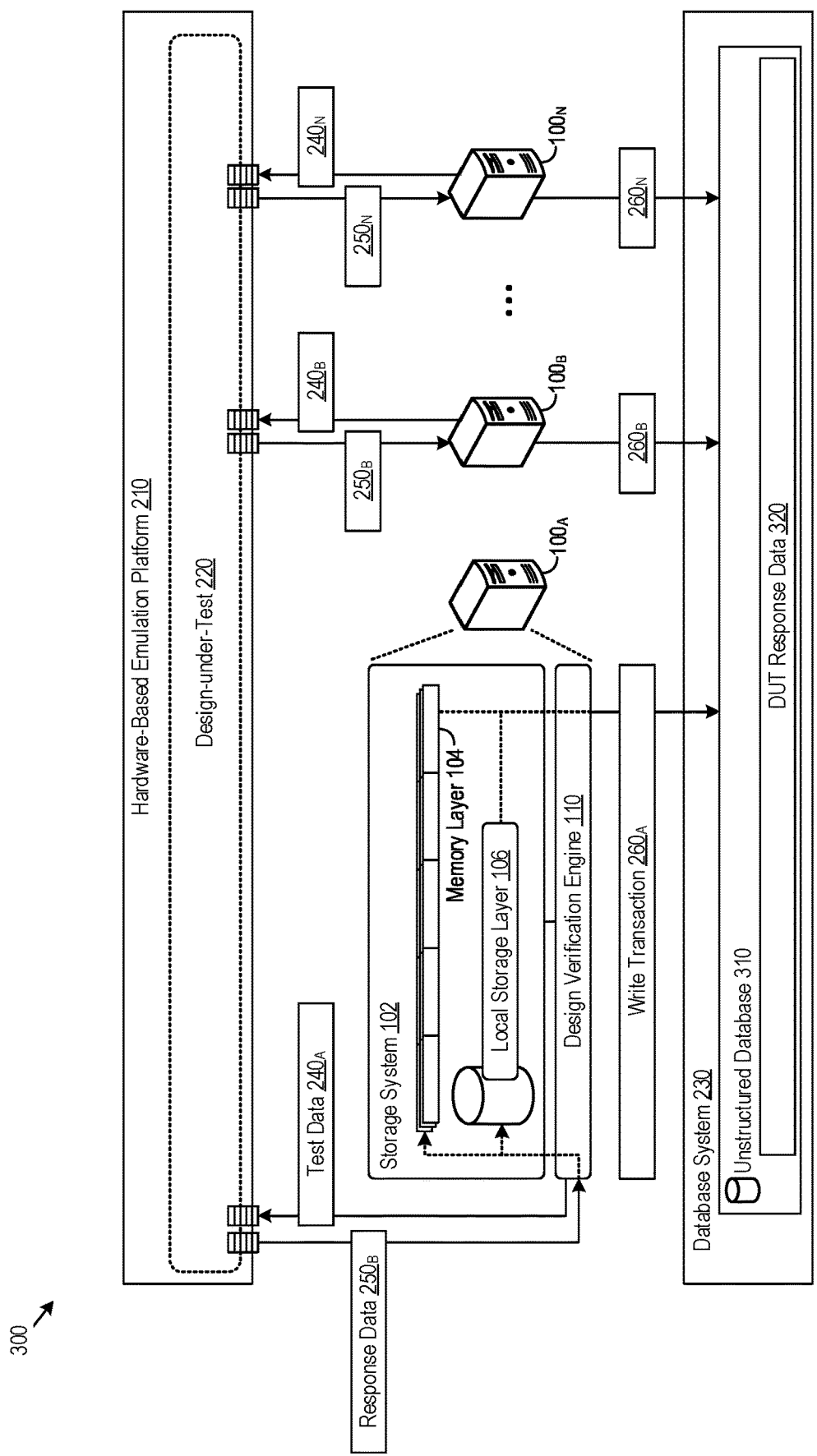
FIG. 3 shows an example of a computing system with multiple verification systems that operate in parallel to support communication protocols design verification through database systems for hardware-based emulation platforms.

FIG. 3 shows an example of a computing system 300 with multiple verification systems that operate in parallel to support communication protocols design verification through database systems for hardware-based emulation platforms. In particular, the example shown in FIG. 3 includes "N" number of verification systems 100, including those labeled as $100_A$, $100_B$, and $100_N$. Each of the verifications systems 100 may share common characteristics and implementations, e.g., each implementing a storage system 102 (with a memory layer 104 and local storage layer 106) as well as a design verification engine 110. In some implementations, each verification system $100_{A-N}$ represents a physically distinct workstation or computing device by which DUT verifications may be separately performed (in parallel) for the DUT 220. Accordingly, the verification system $100_A$ may send test data $240_A$, receive response data $250_A$, and issue write transactions $260_A$ to the database system 230 independent of the verification systems $100_B$ and $100_N$ (each with respective test data $240_B$ and $240_N$, response data $250_B$ and $250_N$, and write transactions $260_B$ and $260_N$ of their own).

The multiple verification systems $100_{A-N}$ may operate in parallel, issuing parallel streams of test data $240_{A-N}$ to the hardware-based emulation platform 210 to test the DUT 220 and, hence, issuing parallel write transactions $260_{A-N}$ to store aggregated response data $250_{A-N}$ in the database system 230. To support parallel operation, the design verification engine 110 of a given verification system 100 may include data coherency and data integrity capabilities to maintain the accuracy of response data transferred to the database system 230. For instance, the design verification engine 110 may implement or interface with database drivers to prevent data collisions and address write conflicts in issuing and executing write transactions to the database system 230. Such features may ensure that parallel streams of DUT response data $250_{A-N}$ stored to the database system 230 are properly stored.

In the example shown in FIG. 3, the database system 230 implements an unstructured database 310 that stores DUT response data 320. The DUT response data 320 may include response data communicated from the various verification systems $100_{A-N}$ (e.g., in parallel) during various testing sessions for the DUT 220. That is, the DUT response data 320 may include multiple different streams of response data from the DUT 220, generated or analyzed by different, independent testing sessions executing in parallel from different testing workstations.

Through use of the unstructured database 310, the database system 230 and design verification engines 110 may reduce write latencies and improve data throughput in storing response data $250_{A-N}$ from the DUT 220. In contrast to a relational database constrained by a particular relational schema or data input format, aggregated response data may be batched and issued in write transactions by the design verification engine 110 without schema formatting. That is, design verification engines 110 of the verification systems $100_{A-N}$ need not take additional time to parse, prepare, format, or otherwise process the write transactions $260_{A-N}$ to ensure compliance with a relational schema, and may instead simply aggregate buffered response data into write transactions without additional formatting. This may reduce write latencies by increasing the speed at which the design verification engine 110 can generate and issue write transactions, while nonetheless maintaining data accuracy and query capabilities for subsequent analysis of the DUT response data 320.

In some examples, the database system 230 additionally or alternatively implements a semi-structured database to store DUT response data. For instance, the design verification engines 110 may differentiate between data packets of different communication protocols received from the hardware-based emulation platform 210, receiving response data streams with packets of different sizes and formats. The design verification engine 110 may include write mechanisms and capabilities to differentiate packets of different communication protocols or protocol-layers for storing each packet in the database system 230 according to its respective communication protocol or protocol-layer. In that regard, the write transaction 260 generated by a design verification engine 110 may be sorted, formatted, or semi-structured to differentiate between data packets of different communication formats (but without other formatting constraints).

Such semi-structuring and differentiation may isolate or differentiate packets of different protocols in the database system 230, which may increase the efficiency of subsequent queries and DUT performance analysis. As such, the design verification engine 110 may format the write transactions $260_{A-N}$ such that data packets from different communication layers are separately stored in respective portion of the database system 230 specific to such communication protocols. In some implementations, the communication protocol or protocol layer may be a specific schema or format requirement for write transactions $260_{A-N}$ issued by the design verification engines 110. Thus, the database system 230 may still provide various latency/performance benefits by reducing or removing the full schema requirements of a structured database, but nonetheless provide distinct storage portions for packet data of different communication layers. Such a semi-structured implementation may improve query speeds and performance of any queries to the database system 230 to obtain DUT performance data. Example query features are described next in FIG. 4.

Figure 4:
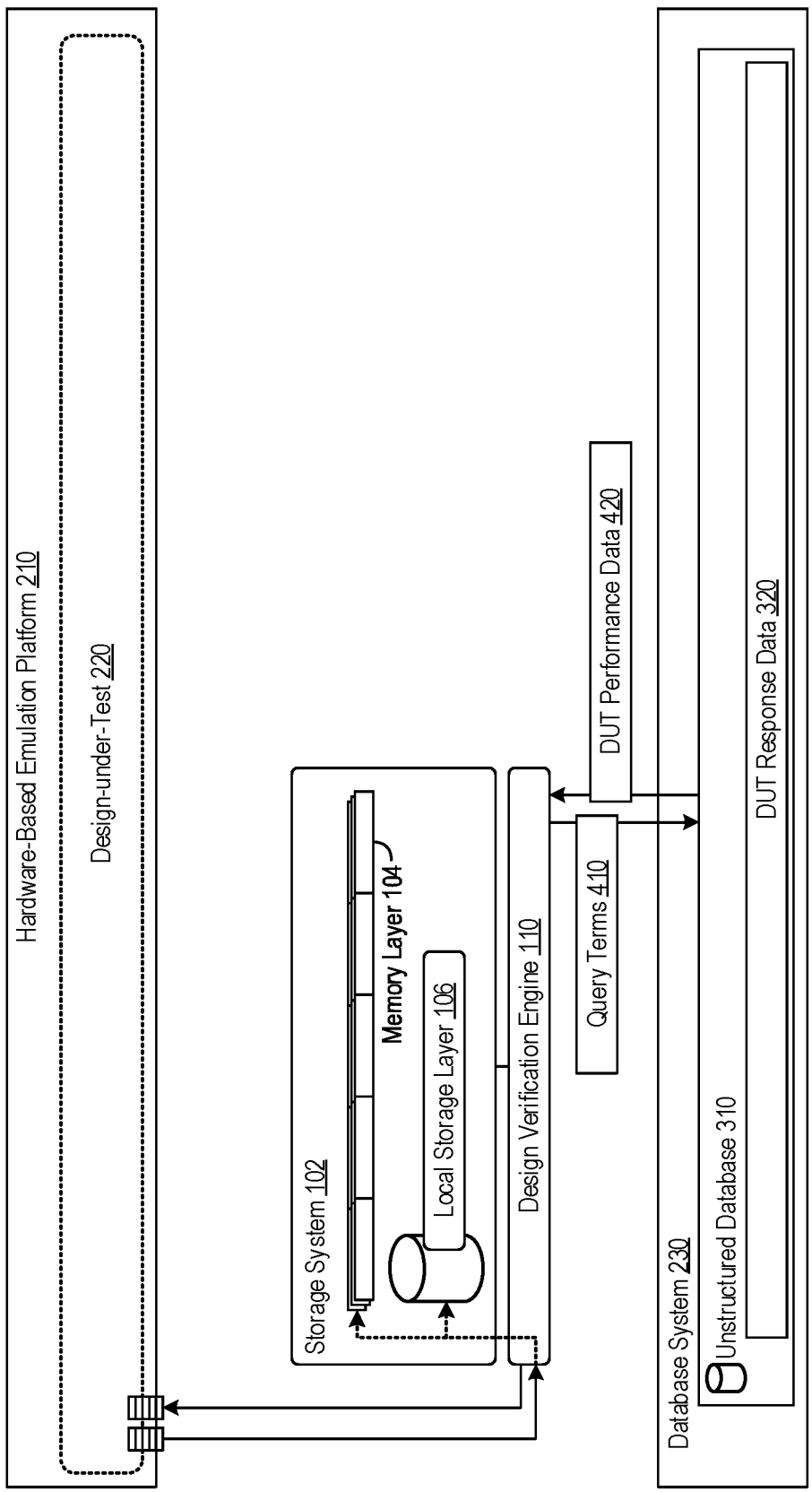
FIG. 4 shows an example of DUT performance analysis that a computing system may support by querying DUT response data stored in a database system.

FIG. 4 shows an example of DUT performance analysis that a computing system may support by querying DUT response data 320 stored in the database system 230. In general sense, the design verification engine 110 may query the DUT response data 320 stored in database system 230 with any number of query terms 410 to obtain DUT performance data 420. The query terms 410 may be, for example, preconfigured or user-specified with criteria to extract specific packet data for the DUT 220 indicative of DUT performance or to support further analysis, score boarding, or benchmarking of the DUT 220.

As noted above, the design verification engine 110 may support various types of packet inspection or analysis prior to aggregating and storing response data 250 in the database system 230. In some implementations, the design verification engine 110 may perform packet inspection, monitoring, and analysis on a per-flow basis (e.g., per network port, MAC address, TCP/IP parameter, according to ingress or egress directions, per application or dataflow ID, or according to any data packet parameters or tuples that identify particular data flows). Such analyses may be performed by the design verification engine 110 on a packet level or bit-level on hardware-accelerated response data provided by the DUT 220.

The query terms 410 used to access the DUT response data 320 may be configured to filter or group specific portions of the DUT response data 320 to determine various performance characteristics of the DUT 220. For instance, the design verification engine 110 may issue query terms 410 that query, filter, group, or process the DUT response data 320 for inter-flow networking analysis and verification (e.g., counting the number of packets in a flow at different ports), inter-port networking analysis and verification (e.g., comparing bandwidth of different Ethernet ports), design-level verifications (e.g., all TCP/IP packets passing through a particular Ethernet port), combinations of other analyses and verifications (e.g., checking the precision or accuracy of data flow routing through particular ports of the DUT 220), or according to any other protocol verification or metric embodied in the query terms 410.

Various benchmarks are likewise contemplated through the query terms 410 and DUT performance data 420. Specific examples of DUT performance data 420 that may be used as benchmarks of DUT performance include a number of packets transferred per port (e.g., per Ethernet port), a lowest port latency for the DUT 220, or application bandwidth or speeds for the DUT 220. Other examples of the DUT performance data 420 include a number of overall packets in the response data, latency data for communication ports of the hardware-based emulation platform 210 specific to the DUT 220, port assignments for different communication protocols tested for the DUT 220, communication bandwidth and latency for the DUT 220, port-level benchmarking data, design-level benchmarking data, flow-level benchmarking data, etc. More generally, the query terms 410 issued by the design verification engine 110 may include any custom or preconfigured benchmark (e.g., $3^{rd}$ party) that can be specified through the query terms 410 to filter, group, scoreboard, or otherwise process the DUT response data 320.

In any of the ways described above, communication protocols verification features may be implemented by a computing system. Such a computing system may efficiently aggregate response data provided by a DUT and store such response data in a database system. The database system may be particularly implemented to store large amounts of generated DUT response data (e.g., for testing sessions that are multiple days or weeks in length), doing so in an unstructured or semi-structured format to improve data access latencies. Moreover, by storing DUT response data in a database system, queries to the DUT response data may be performed to analyze and verify DUT performance with respect to any number of communication protocols or protocol layers.

Figure 5:
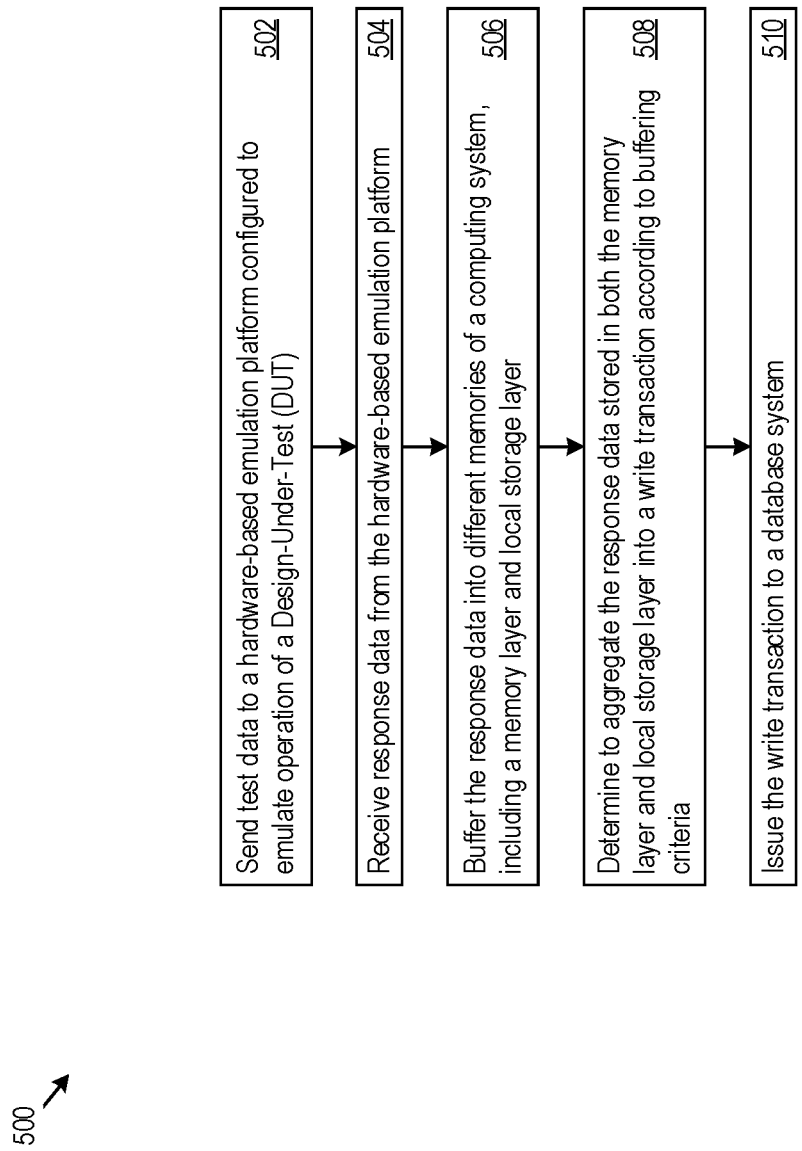
FIG. 5 shows an example of logic that a system may implement to support communication protocols design verification through database systems for hardware-based emulation platforms.

FIG. 5 shows an example of logic 500 that a system may implement to support communication protocols design verification through database systems for hardware-based emulation platforms. In some examples, a computing system may implement the logic 500 as hardware, executable instructions stored on a machine-readable medium, or as a combination of both. For instance, the verification system 100 may implement the logic 500 via the design verification engine 110 through which the verification system 100 may perform or execute the logic 500 as a method to support communication protocols design verification through database systems for hardware-based emulation platforms. The following description of the logic 500 is provided using the design verification engine 110 as an implementation example. However, various other implementation options by a system are possible.

In implementing the logic 500, the design verification engine 110 may send test data 240 to a hardware-based emulation platform 210 configured to emulate operation of a DUT 220 (502). The test data 240 may be configured by the design verification engine 110 with verification settings to test different communication protocols for the DUT 220. As such, datastreams of test data 240 may specifically test design aspects of the DUT 220 with respect to TCP/IP, IPv4, IPv6, HDMI, 802.11, or various other communication protocol.

The design verification engine 110 may receive response data 250 from the hardware-based emulation platform 210 (504) and buffer the response data 250 into different memories of a computing system, including a memory layer 104 and local storage layer 106 (506). The computing system that implements the design verification engine 110, memory layer 104, and local storage layer 106 may be a verification system 100 (e.g., a workstation). As noted herein, the memory layer 104 may have a lower memory access latency than the local storage layer 106.

In further implementing the logic 500, the design verification engine 110 may determine to aggregate the response data 250 stored in both the memory layer 104 and local storage layer 106 into a write transaction 260 according to buffering criteria (508). The buffering criteria may be based on a communication speed of the hardware-based emulation platform 210 (or communication ports thereof), a remaining capacity of the memory layer 104, a remaining capacity of the local storage layer 106, or a combination thereof. Then, the design verification engine 110 may issuing the write transaction 260 to a database system 230 to store the aggregated response data in the database system 230 (510).

While an example implementation of communication protocols verification features according to the present disclosure is shown and described through FIG. 5, the logic 500 may include any number of additional or alternative steps as well. The logic 500 may additionally or alternatively implement any other communication protocols verification features described herein, for example any with respect to the verification system 100, design verification engine 110, computing systems 200 and 300, or any combination thereof.

Figure 6:
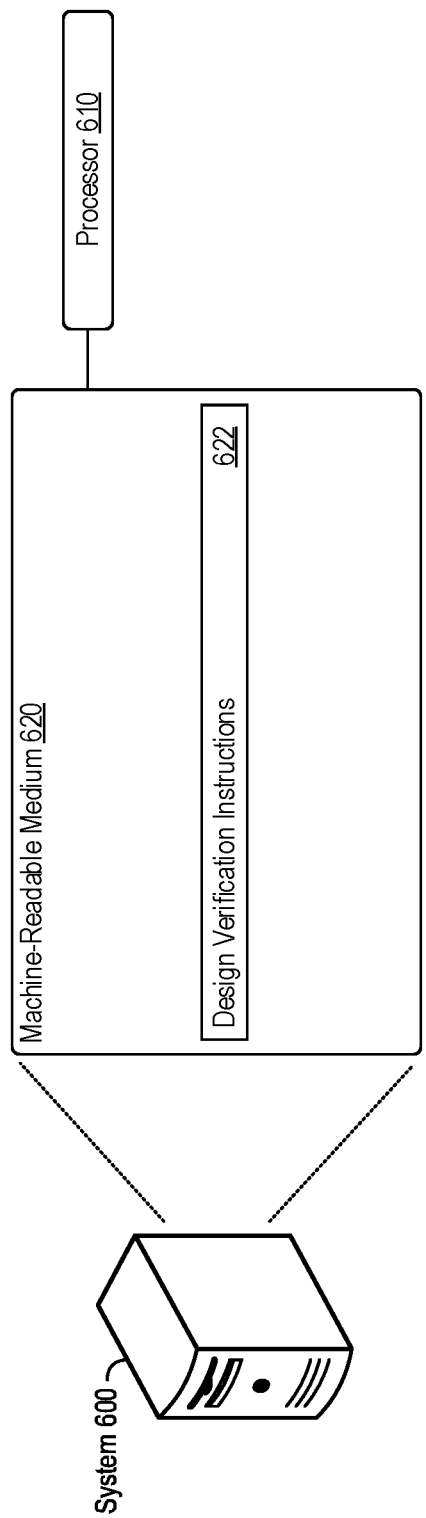
FIG. 6 shows an example of a system that supports communication protocols design verification through database systems for hardware-based emulation platforms.

FIG. 6 shows an example of a system 600 that supports communication protocols design verification through database systems for hardware-based emulation platforms. The system 600 may include a processor 610, which may take the form of a single or multiple processors. The processor(s) 610 may include a central processing unit (CPU), microprocessor, or any hardware device suitable for executing instructions stored on a machine-readable medium. The system 600 may include a machine-readable medium 620. The machine-readable medium 620 may take the form of any non-transitory electronic, magnetic, optical, or other physical storage device that stores executable instructions, such as the design verification instructions 622 shown in FIG. 6. As such, the machine-readable medium 620 may be, for example, random access memory (RAM) such as a dynamic RAM (DRAM), flash memory, spin-transfer torque memory, an electrically-erasable programmable read-only memory (EEPROM), a storage drive, an optical disk, and the like.

The system 600 may execute instructions stored on the machine-readable medium 620 through the processor 610. Executing the instructions may cause the system 600 to perform any of the communication protocols verification features described herein, including according to any of the features of the verification system 100, design verification engine 110, computing systems 200 and 300, or any combination thereof.

For example, execution of the design verification instructions 622 by the processor 610 may cause the system 600 to send test data to a hardware-based emulation platform configured to emulate operation of a DUT, the test data is configured with verification settings to test different communication protocols for the DUT; receive response data from the hardware-based emulation platform; buffer the response data into different memories of the computing system, including a memory layer and local storage layer, wherein the memory layer has a lower memory access latency than the local storage layer; determine to aggregate the response data stored in both the memory layer and local storage layer into a write transaction according to buffering criteria, the buffering criteria based on a communication speed of the hardware-based emulation platform, a remaining capacity of the memory layer, a remaining capacity of the local storage layer, or a combination thereof; and issue the write transaction to a database system to store the aggregated response data in the database system.

The systems, methods, devices, and logic described above, including the verification system 100, design verification engine 110, computing system 200, hardware-based emulation platform 210, database system 230, and computing system 300, may be implemented in many different ways in many different combinations of hardware, logic, circuitry, and executable instructions stored on a machine-readable medium. For example, the verification system 100, design verification engine 110, computing system 200, hardware-based emulation platform 210, database system 230, and computing system 300, or combinations thereof, may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. A product, such as a computer program product, may include a storage medium and machine readable instructions stored on the medium, which when executed in an endpoint, computer system, or other device, cause the device to perform operations according to any of the description above, including according to any features of the verification system 100, design verification engine 110, computing system 200, hardware-based emulation platform 210, database system 230, computing system 300, or any combination thereof.

The processing capability of the systems, devices, and engines described herein, including the verification system 100, design verification engine 110, computing system 200, hardware-based emulation platform 210, database system 230, and computing system 300, may be distributed among multiple system components, such as among multiple processors and memories, optionally including multiple distributed processing systems or cloud/network elements. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library (e.g., a shared library).

While various examples have been described above, many more implementations are possible.

The invention claimed is:

1. A method comprising:
by a computing system:
sending test data to a hardware-based emulation platform configured to emulate operation of a design-under-test ("DUT"), wherein the test data is configured with verification settings to test different communication protocols for the DUT;
receiving response data from the hardware-based emulation platform;
buffering the response data into different memories of the computing system, including a memory layer and local storage layer, wherein the memory layer has a lower memory access latency than the local storage layer;
determining to aggregate the response data stored in both the memory layer and local storage layer into a write transaction according to buffering criteria, the buffering criteria based on a communication speed of the hardware-based emulation platform, a remaining capacity of the memory layer, a remaining capacity of the local storage layer, or a combination thereof; and
issuing the write transaction to a database system to store the aggregated response data in the database system.

2. The method of claim 1, wherein buffering the response data into the memory layer and the local storage layer comprises:
prioritizing storing the response data in the memory layer until the memory layer reaches a stored capacity threshold.

3. The method of claim 2, comprising receiving the response data at a communication rate higher than a maximum access rate of the memory layer; and
wherein prioritizing storing the response data in the memory layer comprises:
inserting a portion of the received response data into the memory layer at the maximum access rate of the memory layer; and
storing a remaining portion of the received response data in the local storage layer.

4. The method of claim 2, wherein buffering the response data into the memory layer and the local storage layer further comprises:
periodically flushing the response data stored in the memory layer into the local storage layer.

5. The method of claim 1, further comprising disabling exception reporting on write transactions for the database system such that any associated errors for the write transaction issued to the database system are not reported to the computing system.

6. The method of claim 1, wherein the database system implements an unstructured database to store response data from the DUT; and further comprising:
querying the response data of the DUT stored in the unstructured database to acquire performance data for the different communication protocols tested for the DUT.

7. The method of claim 6, wherein the performance data comprises a number of overall packets in the response data, latency data for communication ports of the hardware-based emulation platform specific to the DUT, port assignments for the different communication protocols, communication bandwidth and latency for the DUT, port-level benchmarking data, design-level benchmarking data, flow-level benchmarking data, or any combination thereof.

8. A non-transitory machine-readable storing instructions that, when executed by a processor, cause a computing system to:
send test data to a hardware-based emulation platform configured to emulate operation of a design-under-test ("DUT"), wherein the test data is configured with verification settings to test different communication protocols for the DUT;
receive response data from the hardware-based emulation platform;
buffer the response data into different memories of the computing system, including a memory layer and local storage layer, wherein the memory layer has a lower memory access latency than the local storage layer;
determine to aggregate the response data stored in both the memory layer and local storage layer into a write transaction according to buffering criteria, the buffering criteria based on a communication speed of the hardware-based emulation platform, a remaining capacity of the memory layer, a remaining capacity of the local storage layer, or a combination thereof; and
issue the write transaction to a database system to store the aggregated response data in the database system.

9. The non-transitory machine-readable medium of claim 8, wherein the instructions to buffer the response data into the memory layer and the local storage layer comprise instructions that, when executed by the processor, cause the computing system to:
prioritize storing the response data in the memory layer until the memory layer reaches a stored capacity threshold.

10. The non-transitory machine-readable medium of claim 9, the instructions to receive the response data cause the computing system to receive respond data at a communication rate higher than a maximum access rate of the memory layer; and
wherein the instructions to prioritize storing the response data in the memory layer comprise instructions that, when executed, cause the computing system to:
insert a portion of the received response data into the memory layer at the maximum access rate of the memory layer; and
store a remaining portion of the received response data in the local storage layer.

11. The non-transitory machine-readable medium of claim 9, further comprising instructions that, when executed by the processor, cause the computing system to periodically flush the response data stored in the memory layer into the local storage layer, flush the response data stored in the memory layer into the local storage layer when the memory layer reaches a threshold storage capacity, or a combination of both.

12. The non-transitory machine-readable medium of claim 8, further comprising instructions that, when executed by the processor, cause the computing system to disable exception reporting on write transactions for the database system such that any associated errors for the write transaction issued to the database system are not reported.

13. The non-transitory machine-readable medium of claim 8, wherein:
- the database system implements an unstructured database to store response data from the DUT; and
- the response data of the DUT stored in the unstructured database comprises packet data according to the different communication protocols tested for the DUT; and
- further comprising instructions that, when executed by the processor, cause the computing system to query the response data of the DUT stored in the unstructured database to acquire performance data for the different communication protocols tested for the DUT.

* * * * *